(12) United States Patent
Kim et al.

(10) Patent No.: US 8,760,599 B2
(45) Date of Patent: Jun. 24, 2014

(54) DISPLAY DEVICE AND METHOD FOR MANUFACTURING THE SAME

(75) Inventors: Yun-Jae Kim, Yongin (KR); Yang-Han Son, Yongin (KR); Min-Ki Kim, Yongin (KR); Deok-Jung Kim, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 470 days.

(21) Appl. No.: 12/944,631

(22) Filed: Nov. 11, 2010

(65) Prior Publication Data

US 2011/0187957 A1  Aug. 4, 2011

(30) Foreign Application Priority Data

Feb. 3, 2010 (KR) .................... 10-2010-0010060

(51) Int. Cl.
 *G02F 1/1333* (2006.01)
(52) U.S. Cl.
 USPC .......................................................... 349/58
(58) Field of Classification Search
 USPC .......................................................... 349/58
 See application file for complete search history.

(56) References Cited

U.S. PATENT DOCUMENTS

| 2008/0174714 A1* | 7/2008 | Saiki et al. ....................... 349/58 |
| 2010/0245706 A1* | 9/2010 | Oohira ............................. 349/58 |
| 2013/0021280 A1* | 1/2013 | Dabov et al. ................... 345/173 |

FOREIGN PATENT DOCUMENTS

| KR | 10-2006-0072128 | 6/2006 |
| KR | 10-2006-0119132 | 11/2006 |
| KR | 10-2007-0066081 | 6/2007 |
| KR | 10-2008-0004798 | 1/2008 |
| KR | 10-2009-0076565 | 7/2009 |
| KR | 10-2010-0004292 (A) | 1/2010 |
| KR | 2010-0001275 | 1/2010 |
| KR | 10-2010-0011849 (A) | 2/2010 |

OTHER PUBLICATIONS

Korean Notice of Allowance dated Jun. 13, 2011 for Korean Patent Application No. KR 10-2010-0010060 which corresponds to captioned U.S. Appl. No. 12/944,631.

\* cited by examiner

*Primary Examiner* — Eric Wong
(74) *Attorney, Agent, or Firm* — Knobbe, Martens, Olson & Bear, LLP (57) ABSTRACT

A display device and a method for manufacturing the same are disclosed. In one embodiment, the display device includes: i) a display panel configured to display an image via a display surface; a transparent protective portion formed over the display panel, ii) a top chassis formed between the transparent protective portion and the display panel and iii) a bottom chassis formed below the display panel and coupled to the top chassis so as to protect the display panel. The display device may further include 1) a plurality of adhesive members arranged at predetermined intervals on an outer periphery of the display surface of the display panel so as to attach the display panel to the top chassis, 2) an adhesive layer formed between the display panel and the transparent protective portion and 3) a sealing portion formed to fill at least part of the space between i) a sidewall portion of the display panel and ii) the top chassis and bottom chassis.

18 Claims, 5 Drawing Sheets

DISPLAY DEVICE AND METHOD FOR MANUFACTURING THE SAME

RELATED APPLICATIONS

This application claims priority to and the benefit of Korean Patent Application No. 10-2010-0010060 filed in the Korean Intellectual Property Office on Feb. 3, 2010, the entire content of which is incorporated herein by reference.

BACKGROUND

1. Field

The described technology generally relates to a display device and a method for manufacturing the same, and more particularly to a display device that can prevent the introduction of impurities into the display device, and a method for manufacturing the same.

2. Description of the Related Technology

Recently, much effort has been placed on developing various types of flat panel displays, such as liquid crystal display (LCD), plasma display panel (PDP), electroluminescent display (ELD), and vacuum fluorescent display (VFD).

Furthermore, mobile flat panel displays have been widely used owing to their advantages of good picture quality, light weight, thin profile, and low power consumption. In particular, liquid crystal displays, which are used in a variety of applications including monitors for laptops and desktop computers, televisions, other monitors, etc., are one of the most typical flat panel displays.

SUMMARY

One inventive aspect is a display device having advantages of preventing or reducing the introduction of impurities into its display panel, and a method for manufacturing the same.

Another aspect is a display device comprising: a display panel configured to display an image via a display surface; a transparent protective portion formed over the display panel; a top chassis formed between the transparent protective portion and the display panel; a bottom chassis formed below the display panel and coupled to the top chassis so as to protect the display panel; a plurality of adhesive members arranged at predetermined intervals on an outer periphery of the display surface of the display panel so as to attach the display panel to the top chassis; an adhesive layer formed between the display panel and the transparent protective portion; and a sealing portion formed to fill at least part of the space between i) a sidewall portion of the display panel and ii) the top chassis and bottom chassis.

In the above device, the adhesive layer may be formed from a liquid resin. In the above device, the top chassis may comprise a boundary portion formed in substantially parallel with the outer periphery of the display surface of the display panel and a sidewall portion extending downward from an outer edge of the boundary portion. The bottom chassis may comprise a base portion formed in substantially parallel with a bottom surface of the display panel and a sidewall portion extending upward from an edge of the base portion, and wherein a bottom surface is opposing the display surface.

The above device may further comprise: a fastening portion formed at the sidewall portion of the top chassis to be coupled to one side of the bottom chassis; and a corresponding fastening portion formed at the sidewall portion of the bottom chassis to be coupled to the fastening portion of the top chassis.

In the above device, the sealing portion may at least partially fill the space between the fastening portion and the corresponding fastening portion. In the above device, the fastening portion may comprise an engaging hole, and the corresponding fastening portion may comprise a protrusion to be coupled to the engaging hole. In the above device, the sealing portion may at least partially fill the space between the engaging hole of the fastening portion and the protrusion of the corresponding fastening portion. In the above device, the sealing portion may be formed from a liquid resin.

In the above device, the adhesive members may comprise a double-sided tape. In the above device, the adhesive members may be positioned at four edges along the outer periphery of the display panel. In the above device, the adhesive members may be arranged at substantially equal intervals. In the above device, the transparent protective portion may comprise a transparent window or a touch screen panel. In the above device, the adhesive layer and the sealing portion may be formed from a thermally curable liquid resin. In the above device, the display panel may be an LCD panel. The above device further may comprise a backlight unit formed between the display panel and the bottom chassis.

Another aspect is a method of manufacturing a display device comprising: providing a plurality of adhesive members arranged at predetermined intervals on an outer periphery of a display surface of a display panel, wherein the display panel is configured to display an image via the display surface, and wherein a plurality of gaps are formed between the adhesive members; interposing the display panel between a bottom chassis and a top chassis; applying a liquid resin on the display surface of the display panel; pressing a transparent protective portion on the liquid resin so that at least part of the liquid resin leaks out through the gaps; and guiding the leaked liquid resin to flow into the space between i) lateral sides of the display panel and ii) the top chassis and bottom chassis so that the space is at least partially filled with the liquid resin.

The above method may further comprise curing the liquid resin with the use of heat after at least partially filling the liquid resin in the space between the top chassis and the bottom chassis. In the above method, the adhesive members may be formed at all four edges forming the outer periphery of the display panel. In the above method, the adhesive members may be arranged at substantially equal intervals.

Another aspect is a display device comprising: a top chassis comprising a side wall; a bottom chassis comprising a side wall and coupled to the top chassis; a display panel interposed between the top chassis and the bottom chassis, wherein both of the top chassis and the bottom chassis are greater in size than the display panel so that the side wall of the bottom chassis contacts the side wall of the top chassis while the display panel contacts neither of the side walls of the top chassis and the bottom chassis; and a sealing material provided in at least part of an inner portion of the sidewalls of the top chassis and the bottom chassis.

DETAILED DESCRIPTION

Recently, a touch panel LCD having touch panels laminated thereon has been widely used. The touch panel LCD senses a touch by a finger or a stylus pen, detects a change of electrical properties such as resistance or electrostatic capacity, and outputs information corresponding to the touch or performs an operation based on the touch. The touch panel LCD is a kind of user interface, and its application extends to small portable terminals, office equipment, mobile phones, and the like.

Such a touch panel LCD device senses a touch on the surface of the display device. A gap is generally formed between an outer protecting layer of the touch panel and a touch panel frame. Hence, there is the possibility that impurities or liquids may enter through the gap.

If any impurity (dust or water) enters through the gap between the outer protecting layer of the touch panel and the touch panel frame or through a gap between a screen and a frame of the display device, the impurity entering the display device may be introduced into a display panel inside the display device. An impurity in the display panel can cause a degradation of its performance.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
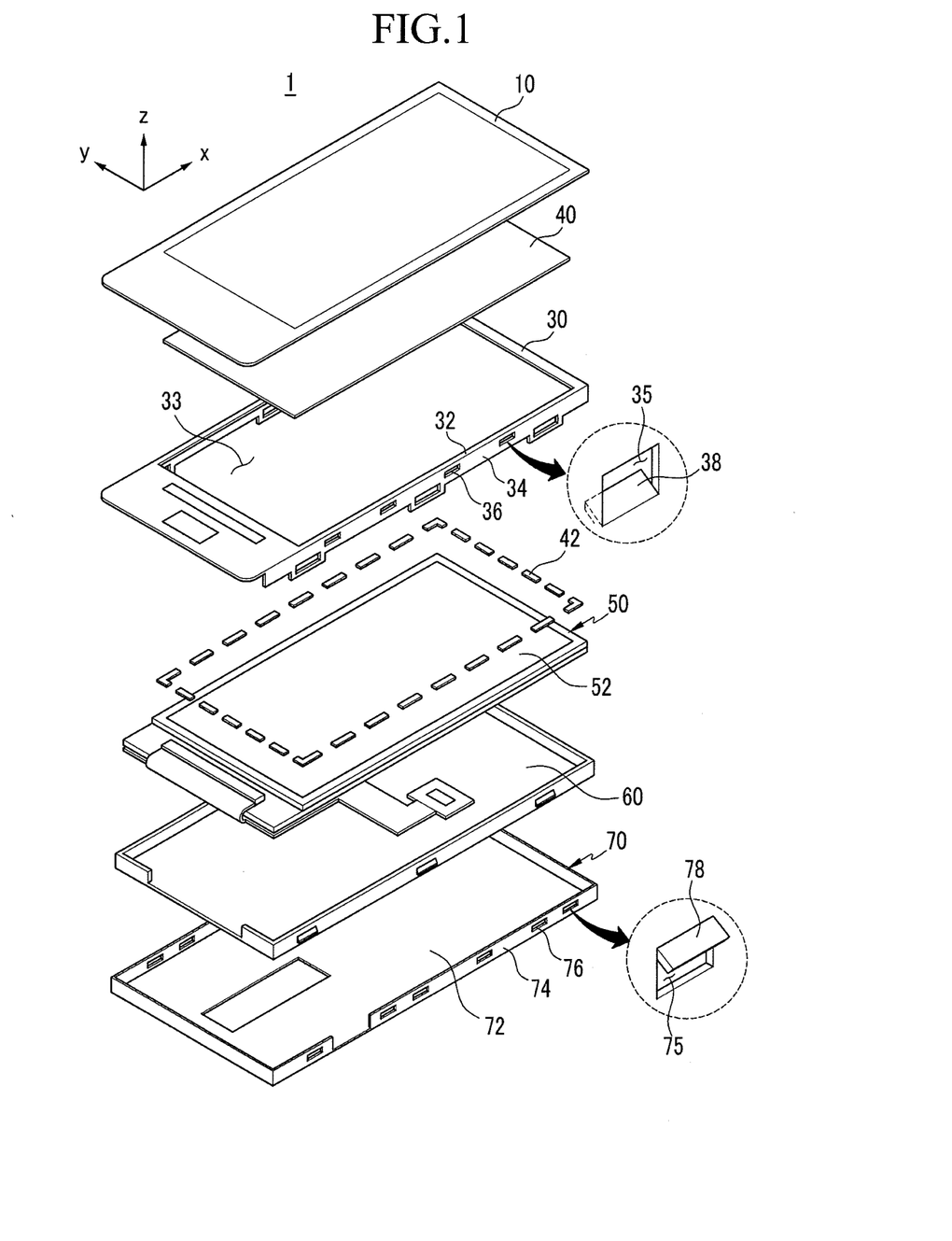
FIG. 1 is an exploded perspective view of a liquid crystal display device according to one exemplary embodiment.
Figure 2:
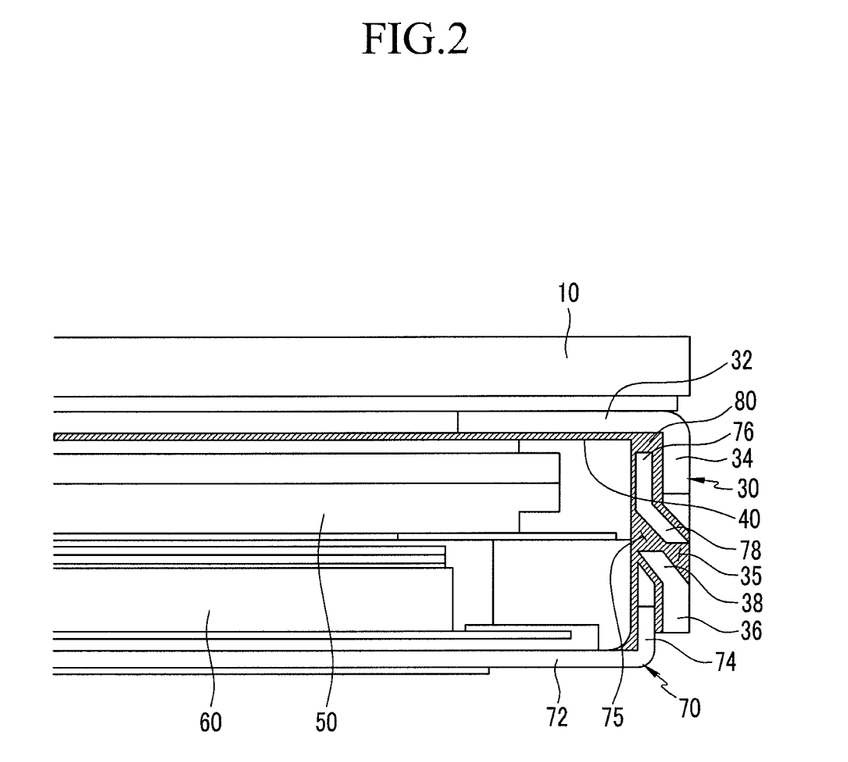
FIG. 2 is a partial cross-sectional view of a coupled state of the display device according to one exemplary embodiment.
Figure 3:
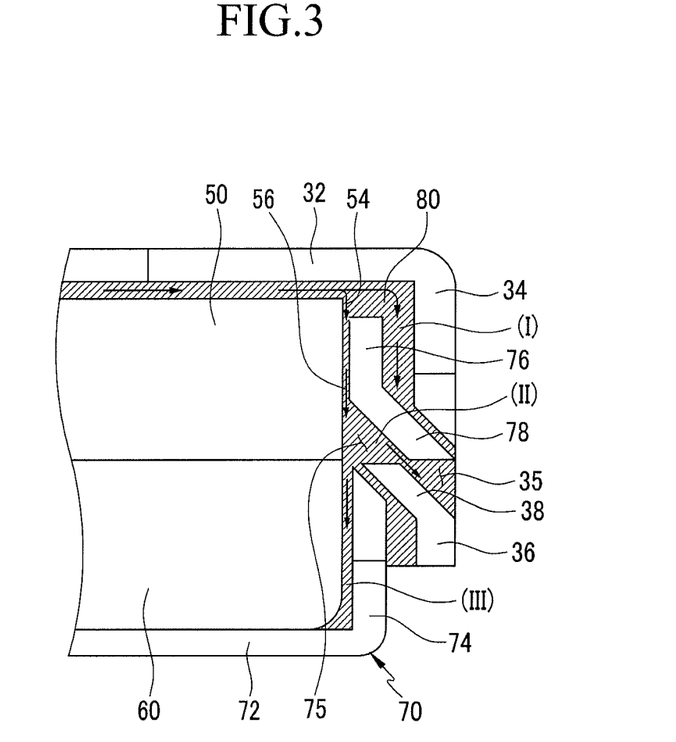
FIG. 3 is an enlarged cross-sectional view of a portion of FIG. 2.

FIG. 1 is an exploded perspective view of a liquid crystal display device according to one exemplary embodiment. FIG. 2 is a partial cross-sectional view of a coupled state of the display device according to one exemplary embodiment. FIG. 3 is an enlarged cross-sectional view of FIG. 2. In describing one exemplary embodiment, it is to be understood that the terms "top", "upper", "bottom", "lower", "side", and "lateral" as used in FIGS. 1 to 3 will refer to the top, upper, bottom, lower, side, and lateral portions of the corresponding components with reference to the orientation of FIGS. 1 to 3.

Referring to FIGS. 1 to 3, a display device 1 includes a transparent protective part 10, a top chassis 30, a display panel 50, and a bottom chassis 70. An adhesive layer 40 is interposed between the transparent protective part 10 and the display panel 50, and adhesive members 42 are positioned between the display panel 50 and the top chassis 30.

Referring to FIG. 1, the transparent protective part 10 is a component that is positioned at an upper end of the display device 1 to protect the screen of the display panel 50.

The transparent protective part 10 may include a transparent window or a transparent window including a touch screen. The transparent protective part 10 may be made of a synthetic resin material.

The display panel 50 is formed below the transparent protective part 10 so as to be fixed between the top chassis 30 and the bottom chassis 70.

The top chassis 30 is an upper housing for protecting the display panel 50.

The top chassis 30 includes a boundary surface 32 positioned over the outer periphery of the front surface of the display panel 50, and a sidewall portion 34 extending downward from an outer edge of the boundary surface 32 and protecting lateral sides of the display panel.

A rectangular opening 33 is formed inside the boundary surface 32 so that an image display part 52 of the display panel 50 is opened upward. The adhesive layer 40 is formed between the top surface of the image display part 52 and the transparent protective part 10 of the display panel 50.

According to the present exemplary embodiment, the adhesive layer 40 to be formed above the image display part 52 is formed by curing a liquid resin. A more detailed description thereof will be given later.

A fastening portion 36, which is to be coupled to a corresponding fastening portion 76 formed at one side of the top chassis 30 to be described later, is provided at one side of the sidewall portion 34 of the bottom chassis 30.

The display panel 50 may be formed of an LCD panel having a liquid crystal layer that includes a liquid crystal element. It should be noted that, although the display panel in the display device according to the present exemplary embodiment is an LCD panel, the display panel is not limited thereto and various types of display panels (OLED, ELD, etc.) can be used.

According to the present exemplary embodiment, the display panel 50 is formed so as to be bonded to the top chassis 30. The adhesive members 42 are positioned between the display panel 50 and the top chassis 30 to bond the display panel 50 to the top chassis 30. In one embodiment, the adhesive members 42 are formed from a plurality of pieces of double-sided tape that are spaced apart at predetermined intervals and adhered to the bottom surface of the boundary surface 32 of the top chassis 30 and to the outer periphery of the image display part 52 of the display panel 50.

A backlight unit 60 is installed under the display panel 50. According to an exemplary embodiment, the backlight unit 60 emits light to the display panel 50 so as to display an image by the image display part 52 of the display panel 50.

In the present exemplary embodiment, the display panel 50 is a panel such as an LCD panel that receives light emitted from the backlight unit 60 in order to display an image, so the backlight unit 60 is formed to be positioned under the display panel.

The bottom chassis 70 is a component that is coupled to the top chassis 30 to protect the display panel 50 and the backlight unit 60.

The bottom chassis 70 includes a base portion 72 forming the bottom surface and a sidewall portion 74 extending upward from an edge of the base portion 72 when viewed from FIG. 1. A corresponding fastening portion 76 corresponding to the aforementioned fastening portion 36 of the top chassis is formed at one side of the bottom chassis sidewall portion 74.

Referring to FIGS. 1 to 3, in the top chassis 30 and bottom chassis 70 for protecting the display panel 50 of the display device according to one exemplary embodiment, the fastening portion 36 formed in the top chassis 30 and the corresponding fastening portion 76 formed in the bottom chassis 70 are physically coupled to each other.

To this end, the fastening portion 36 of the top chassis 30 includes an outer engaging hole 35 formed at one side of the side portion and an inner protrusion 38 projecting inward under the outer engaging hole 35 from the sidewall portion. The inner protrusion 38 is formed to be inclined upward toward the inside.

The corresponding fastening portion 76 of the bottom chassis 70 includes an inner engaging hole 75 formed at one side of the side portion 74 and an outer protrusion 78 projecting outward over the inner engaging hole 75 from the sidewall portion. The outer protrusion 78 is formed to be inclined downward toward the outside.

As can be seen from FIGS. 1 to 3, according to the present exemplary embodiment, the fastening portion 36 of the top chassis 30 and the corresponding fastening portion 76 of the bottom chassis 70 have a structure configured to be physically fastened by the inner protrusion 38 and the outer protrusion 78 engaging with each other.

The fastening portion 36 and corresponding fastening portion 76, thus physically fastened to each other, can be transversely formed in a multiple number at the sidewall portion of the top chassis 30 and the sidewall portion of the bottom chassis 70. Although the present exemplary embodiment has been described with respect to the fastening portion and the corresponding fastening portion each including an engaging hole and a protrusion, the configurations of the fastening portion and corresponding portion for physically coupling the top chassis to the bottom chassis may be modified in various manners.

The display device 1 according to the present exemplary embodiment allows the display panel 50 and the backlight unit 60 to be safely protected within the top chassis 30 and the bottom chassis 70 as the fastening portion 36 and the corresponding portion 76 are fastened to each other, and thus the top chassis 30 and the bottom chassis 70 are coupled to each other.

At this point, an empty space is formed between inner side surfaces of the top chassis 30 and bottom chassis 70 and lateral sides of the display panel 50 and backlight unit 60.

Such an empty space is a marginal space for physically coupling the top chassis 30 to the bottom chassis 70, with the display panel 50 and the backlight unit 60 being positioned between the top chassis 30 and the bottom chassis 70.

At this point, the space formed between the inner side surfaces of the top chassis 30 and bottom chassis 70 and the lateral sides of the display panel 50 and backlight unit 60 may be spatially connected to outer sides of the top chassis 30 and bottom chassis 70 through the inner engaging hole 75 and outer engaging hole 35 of the fastening portion 36 and corresponding fastening portion 76.

The display device 1 according to one exemplary embodiment includes a sealing portion 80 formed in at least one of inner spaces between the lateral sides of the display panel 50 and the top chassis 30 and bottom chassis 70. For example, the sealing portion 80 is formed in at least one of: a space (I) between an upper part of the inner side surface of the top chassis 30 and the corresponding fastening portion of the bottom chassis 70, a space (II) where the engaging holes of the top chassis 30 and bottom chassis 70 are positioned, and a space (III) between a side surface of the bottom chassis 70 and the backlight unit 60 when viewed from FIG. 3.

In one embodiment, the display device is configured such that, when viewed from FIG. 3, the sealing portion is formed in the space (II), where the engaging holes of the top chassis 30 and bottom chassis 70 are positioned, to block an opening through which impurities may be introduced from the outside of the top chassis 30 and bottom chassis 70.

According to one exemplary embodiment, the sealing portion 80 may be formed by curing a liquid resin.

In the present exemplary embodiment, the liquid resin forming the sealing portion 80 is the liquid resin that is applied to the top surface of the display panel to form the adhesive layer and then introduced from the top surface of the display panel to the lateral sides of the display panel.

In one embodiment, the adhesive layer 40 is formed between the image display part 52 of the display panel 50 and the transparent protective part 10, with the display panel 50 being positioned within the top chassis 30 and bottom chassis 70. In this embodiment, the liquid resin applied to the image display part 52 to form the adhesive layer 40 spreads out from the top surface of the image display part 52 toward an edge 54 of the display panel 50 and then flows down to the sidewall portions of the top chassis 30 and bottom chassis 70 along the side surfaces of the edge 54 to fill at least part of an inside space of the top chassis and the bottom chassis.

In one embodiment, the display device 1 is configured such that a larger amount of liquid resin is applied on top of image display part 52 than needed to be filled on top of the image display part 52 to form the adhesive layer in the process of applying the liquid resin forming the adhesive layer on top of the image display part 52 of the display panel 50.

With a large amount of liquid resin being thus applied to the upper side of the image display part 52, when the transparent protective part 10 presses the liquid resin, the liquid resin spreads outward from the center of the image display part 52 and fills the inner side of the top surface of the display panel 50 surrounded by a plurality of adhesive members 42. Thereafter, as can be seen from FIG. 4, the liquid resin passes through openings 44 between the adhesive members 42 and spreads out to the outer edge 54 of the display panel 50, i.e., to upper ends of the sides of the display panel.

Figure 4:
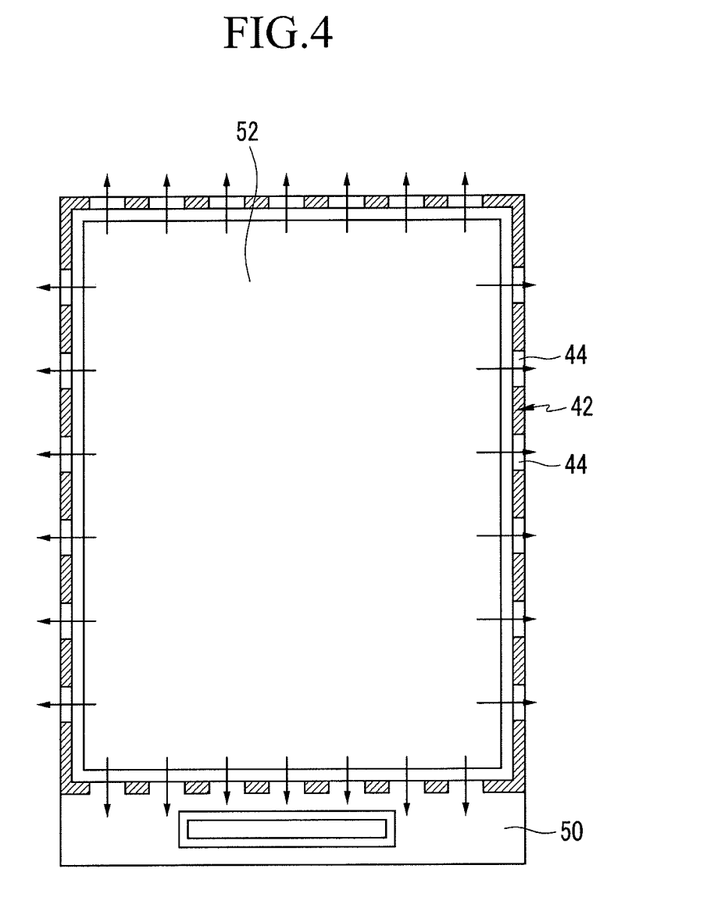
FIG. 4 is a plan view illustrating an arrangement of adhesive members on a display panel of the display device according to one exemplary embodiment.

Thereafter, the liquid resin flows downward from the upper ends of the sides of the display panel 50 and fills at least part of the inner space between a sidewall portion 56 of the display panel 50 and the top chassis 30 and bottom chassis 70.

At this time, referring to FIG. 4, the plurality of adhesive members 42 are spaced apart at substantially equal intervals along the outer periphery of the image display part 52. Hence, when the liquid resin is pressed with a uniform pressure by the transparent protective part 10, the liquid resin may spread out to the four surfaces of the display panel through the openings 44 between the adhesive members 42 along the circumference of the image display part.

The intervals at which double-sided tape serving as the plurality of adhesive members 42 are disposed do not have to be equal, but may be chosen to be sufficient to pass the four edges of the display panel 50, being spread out to the outer periphery from the top surface of the display panel 50, and to be substantially uniformly moved to the sidewall portion 56 of the display panel 50.

If the transverse length of the adhesive members is too large, in the case that the viscosity of the liquid resin is high, the liquid resin may be present only at a part of the sidewall portion of the display panel. In one embodiment, the transverse length of the adhesive members is not too large. For instance, the width and interval of the adhesive members may be about 1 mm or more.

In this way, as the liquid resin spreads out substantially uniformly to the four surfaces of the display panel and fills at least part of the inner space between the display panel 50 and the top chassis 30 and bottom chassis 70, the liquid resin can be filled in openings, such as the engaging holes, formed in the top chassis 30 and bottom chassis 70 so that the top chassis 30 and the bottom chassis 70 are coupled to each other or the top chassis 30 and the bottom chassis 70 are fastened to other components, e.g., the backlight unit 60.

If the amount of the liquid resin applied on the display panel 50 is too large, the liquid resin may escape through the opening of the top chassis 30. In one embodiment, the amount of the applied liquid resin be adjusted to prevent the liquid resin from escaping through the opening.

In one embodiment, the liquid resin is a thermally curable liquid resin.

Therefore, when the liquid resin is cured by applying heat when the liquid resin is filled in the inner space between the lateral sides of the display panel 50 and the top chassis and bottom chassis, the cured liquid resin forms the adhesive layer 40 between the transparent protective part 10 and the image display part 52, and the liquid resin present in the sidewall portion of the display panel 50 and the inner sides of the top chassis and bottom chassis is cured as well to form the sealing portion 80.

The sealing portion 80 formed by curing the liquid resin present in the sidewall portion of the display panel 50 and the inner sides of the top chassis 30 and bottom chassis 70 can prevent the introduction of impurities that, in case there is no cured liquid resin, may be introduced into the top chassis 30 and the bottom chassis 70 from outside the top chassis 30 and bottom chassis 70 through the inner and outer engaging holes 75 and 35 formed in the top chassis 30 and bottom chassis 70.

Figure 5:
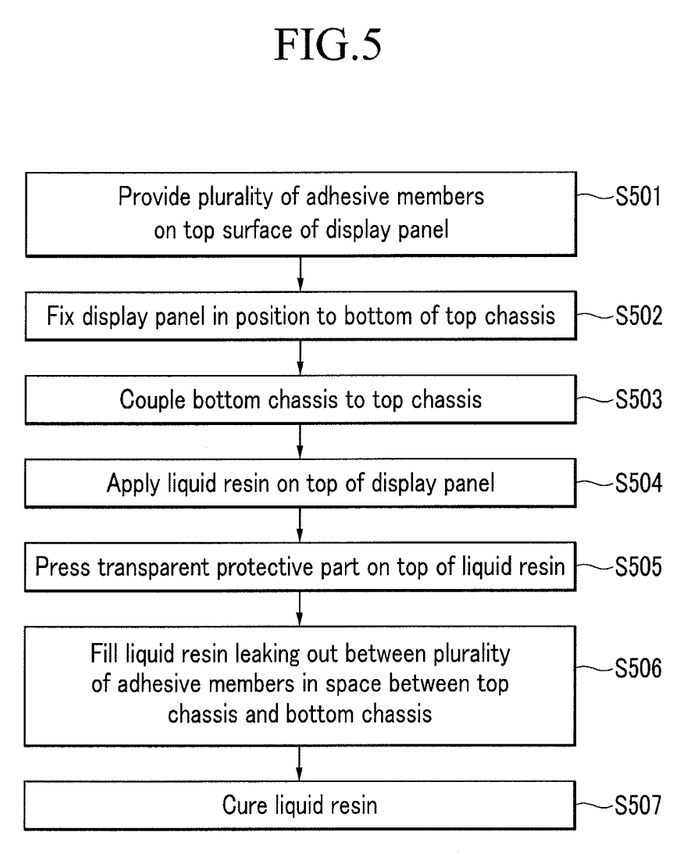
FIG. 5 is a flowchart showing a method for manufacturing a display device according to one exemplary embodiment.

FIG. 5 is a flowchart showing a method of manufacturing a display device according to one exemplary embodiment.

Referring to FIG. 5, first, a plurality of adhesive members 42 are attached at predetermined intervals on the outer periphery of the top surface of the display panel 50 in order to provide a display device according to one exemplary embodiment. (S501)

The plurality of adhesive members 42 may be pieces of rectangular double-sided tape.

The adhesive members 42 may be attached along the four edges of the top surface of the display panel 50.

Thereafter, the display panel 50 is fixed in position to the bottom of the top chassis 30 (S502). In one embodiment, the top surfaces of the double-sided tape attached to the outer periphery of the top surface of the display panel 50 are attached to the bottom of the top chassis 30, i.e., the bottom surface of the boundary surface 32 of the top chassis.

Accordingly, the top surface of the display panel 50 and the bottom surface of the top chassis 30 are coupled together by the double-sided tape. The intervals of the plurality of pieces of double-side tape for coupling the display panel 50 and the top chassis 30 together form openings that allow the liquid resin to escape from the inside of the plurality of adhesive members to the outside thereof when the transparent protective part 10 is adhered onto the top chassis 30 by the adhesive layer.

Afterwards, the backlight unit 60 is positioned under the display panel 50, and the bottom chassis 70 is coupled to the top chassis 30 so that the backlight unit 60 and the display panel 50 are positioned between the top chassis 30 and the bottom chassis 70. (S503)

In one embodiment, the coupling of the bottom chassis 70 to the top chassis 30 is achieved by physically coupling the corresponding fastening portion 76 formed at the bottom chassis 70 to the fastening portion 36 formed at the top chassis 30.

With the top chassis 30 and the bottom chassis 70 thus coupled to each other, the liquid resin is applied to the top surface of the display panel 50. (S504)

In one embodiment, the amount of the liquid resin to be applied to the top surface of the display panel 50 is an amount that is sufficient to fill at least part of the space between the top chassis 30 and bottom chassis 70 and the display panel 50 after covering the image display part 52 at a predetermined thickness and then being discharged outward through the openings formed between the plurality of adhesive members 42.

Thereafter, in a state in which the liquid resin is applied, the transparent protective part 10 is pressed on top of the liquid resin. (S505)

When the liquid resin is pressed, the liquid resin leaks out between the intervals of the plurality of adhesive members 42 between the display panel 50 and the top chassis 30, and fills at least part of the space between the top chassis 30 and the bottom chassis 70. (S506)

When the space between the top chassis 30 and bottom chassis 70 and the display panel 50 is at least partially filled with the liquid resin, heat is applied to the liquid resin to cure the liquid resin. (S507)

Accordingly, the cured liquid resin present between the transparent protective part 10 and the display panel 50 forms the adhesive layer 40 that adheres between the transparent protective part 10 and the display panel 50.

Moreover, the cured liquid resin, being disposed in the space between the display panel 50 and the top chassis 30 and bottom chassis 70, forms the sealing portion 80.

The sealing portion 80 prevents impurities from being introduced through the openings, such as the engaging holes, formed in the top chassis 30 and bottom chassis 70.

If the liquid resin is a material that is naturally cured at room temperature without application of heat, the liquid resin curing process may be omitted.

According to one exemplary embodiment, the gaps between the openings formed in the fastening portions and corresponding fastening portions formed in the top chassis and bottom chassis so as to couple the top and bottom chassis for protecting the display panel are at least partially filled with the liquid resin for adhering between the display panel and the transparent protective part, thereby preventing the introduction of impurities from the outside of the top and bottom chassis.

Using the method for manufacturing a display device according to one exemplary embodiment, it is possible to provide a display device that is capable of preventing the introduction of impurities from the outside by a simple process because the sealing portion filling at least part of the space between the top chassis and bottom chassis and the display panel can be formed merely by disposing a plurality of adhesive members at substantially equal intervals, coupling the display panel to the transparent protective part, and applying a sufficient amount of liquid resin.

The area where the liquid resin is present may be adjusted by adjusting the length of the adhesive members for adhering the top chassis to the display panel or the intervals of adjacent adhesive members.

For example, according to another exemplary embodiment, the sealing portion may also be formed in such a manner that, when filling at least part of the sidewall portion of the display panel and the inner sides of the top and bottom chassis, the openings of the pieces of double-sided tape are formed only at the positions of the fastening and corresponding fastening portions of the top and bottom chassis to thus fill at least part of the liquid resin only in the fastening and corresponding fastening portions of the top and bottom chassis and the sidewall portion of the display panel.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a display panel configured to display an image via a display surface;

a transparent protective portion formed over the display panel;

a top chassis formed between the transparent protective portion and the display panel;

a bottom chassis formed below the display panel and coupled to the top chassis so as to protect the display panel, wherein at least one engaging hole is formed in each of the top chassis and the bottom chassis;

a plurality of adhesive members arranged at predetermined intervals on an outer periphery of the display surface of the display panel so as to attach the display panel to the top chassis;

an adhesive layer formed between the display panel and the transparent protective portion; and a sealing portion formed of an adhesive material, wherein the adhesive material fills at least the space where the engaging holes of the top chassis and bottom chassis are formed.

2. The display device of claim 1, wherein the adhesive layer is formed from a liquid resin.

3. The display device of claim 1, wherein the top chassis comprises a boundary portion formed in substantially parallel with the outer periphery of the display surface of the display panel and a sidewall portion extending downward from an outer edge of the boundary portion, wherein the bottom chassis comprises a base portion formed in substantially parallel with a bottom surface of the display panel and a sidewall portion extending upward from an edge of the base portion, and wherein a bottom surface is opposing the display surface.

4. The display device of claim 3, further comprising:

a fastening portion formed at the sidewall portion of the top chassis to be coupled to one side of the bottom chassis; and a corresponding fastening portion formed at the sidewall portion of the bottom chassis to be coupled to the fastening portion of the top chassis.

5. The display device of claim 4, wherein the sealing portion at least partially fills the space between the fastening portion and the corresponding fastening portion.

6. The display device of claim 4, wherein the fastening portion comprises the engaging hole of the top chassis, and wherein the corresponding fastening portion comprises a protrusion to be coupled to the engaging hole of the top chassis.

7. The display device of claim 6, wherein the sealing portion at least partially fills the space between the engaging hole of the fastening portion and the protrusion of the corresponding fastening portion.

8. The display device of claim 1, wherein the sealing portion is formed from a liquid resin.

9. The display device of claim 1, wherein the adhesive members comprise a double-sided tape.

10. The display device of claim 1, wherein the adhesive members are positioned at four edges along the outer periphery of the display panel.

11. The display device of claim 1, wherein the adhesive members are arranged at substantially equal intervals.

12. The display device of claim 1, wherein the transparent protective portion comprises a transparent window or a touch screen panel.

13. The display device of claim 1, wherein the adhesive layer and the sealing portion are formed from a thermally curable liquid resin.

14. The display device of claim 1, wherein the display panel is an LCD panel.

15. The display device of claim 1, further comprising a backlight unit formed between the display panel and the bottom chassis.

16. A display device comprising:

a top chassis comprising a side wall;

a bottom chassis comprising a side wall and coupled to the top chassis, wherein at least one engaging hole is formed in each of the top chassis and the bottom chassis;

a display panel interposed between the top chassis and the bottom chassis, wherein both of the top chassis and the bottom chassis are greater in size than the display panel so that the side wall of the bottom chassis contacts the side wall of the top chassis while the display panel contacts neither of the side walls of the top chassis and the bottom chassis; and a sealing material formed of an adhesive material, wherein the adhesive material fills at least the space where the engaging holes of the top chassis and bottom chassis are formed.

17. The display device of claim 1, wherein the engaging hole of the top chassis does not directly face the engaging hole of the bottom chassis.

18. The display device of claim 16, wherein the engaging hole of the top chassis does not directly face the engaging hole of the bottom chassis.

* * * * *